(12) United States Patent
Reddy et al.

(10) Patent No.: US 8,760,986 B2
(45) Date of Patent: Jun. 24, 2014

(54) READ CHANNEL THROUGHPUT MANAGEMENT

(75) Inventors: Prafulla Bollampalli Reddy, Longmont, CO (US); Hui Su, Longmont, CO (US); Michelle Elaine Blankenship, Lyons, CO (US); Eddie Wai Pun, South San Francisco, CA (US); John Marc Wright, Broomfield, CO (US); Ara Patapoutian, Hopkinton, MA (US); Hieu V Nguyen, Superior, CO (US)

(73) Assignee: Seagate Technology LLC, Cupertino, CA (US)

( * ) Notice: Subject to any disclaimer, the term of this patent is extended or adjusted under 35 U.S.C. 154(b) by 130 days.

(21) Appl. No.: 13/408,849

(22) Filed: Feb. 29, 2012

(65) Prior Publication Data

US 2013/0222939 A1    Aug. 29, 2013

(51) Int. Cl.
*G11B 11/00* (2006.01)

(52) U.S. Cl.
USPC .................................................. 369/53.36

(58) Field of Classification Search
USPC ............ 369/59.22, 53.34, 53.36, 47.1, 53.35, 369/124.01; 360/53, 49, 31, 51, 61
See application file for complete search history.

(56) References Cited

U.S. PATENT DOCUMENTS

| | | | | |
|---|---|---|---|---|
| 5,379,160 | A | * | 1/1995 | Otani .............................. 360/49 |
| 5,388,105 | A | * | 2/1995 | Takagi et al. .................. 714/758 |
| 7,843,660 | B1 | * | 11/2010 | Yeo ................................. 360/53 |
| 2008/0198720 | A1 | * | 8/2008 | Nakamura et al. .......... 369/59.22 |

* cited by examiner

*Primary Examiner* — Nabil Hindi
(74) *Attorney, Agent, or Firm* — HolzerIPLaw, PC (57) ABSTRACT

An implementation of a system disclosed herein provides a method of deferring decoding of a data sector received at a read channel of a storage device, in response to determining that a data sector cannot be decoded by a first decoder and storing the data sector for further processing by a second decoder.

19 Claims, 4 Drawing Sheets

READ CHANNEL THROUGHPUT MANAGEMENT

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An implementation of a system disclosed herein provides a method of deferring decoding of a data sector received at a read channel of a storage device, in response to determining that a data sector cannot be decoded by a first decoder and storing the data sector for further processing by a second decoder.

These and various other features and advantages will be apparent from a reading of the following detailed description.

DETAILED DESCRIPTIONS

Implementations of the technology described herein are disclosed herein in the context of a read channel throughput management system. Reference will now be made in detail to implementations of the technology described herein as illustrated in the accompanying drawings and the following detailed description to refer to the same or like parts.

Figure 1:
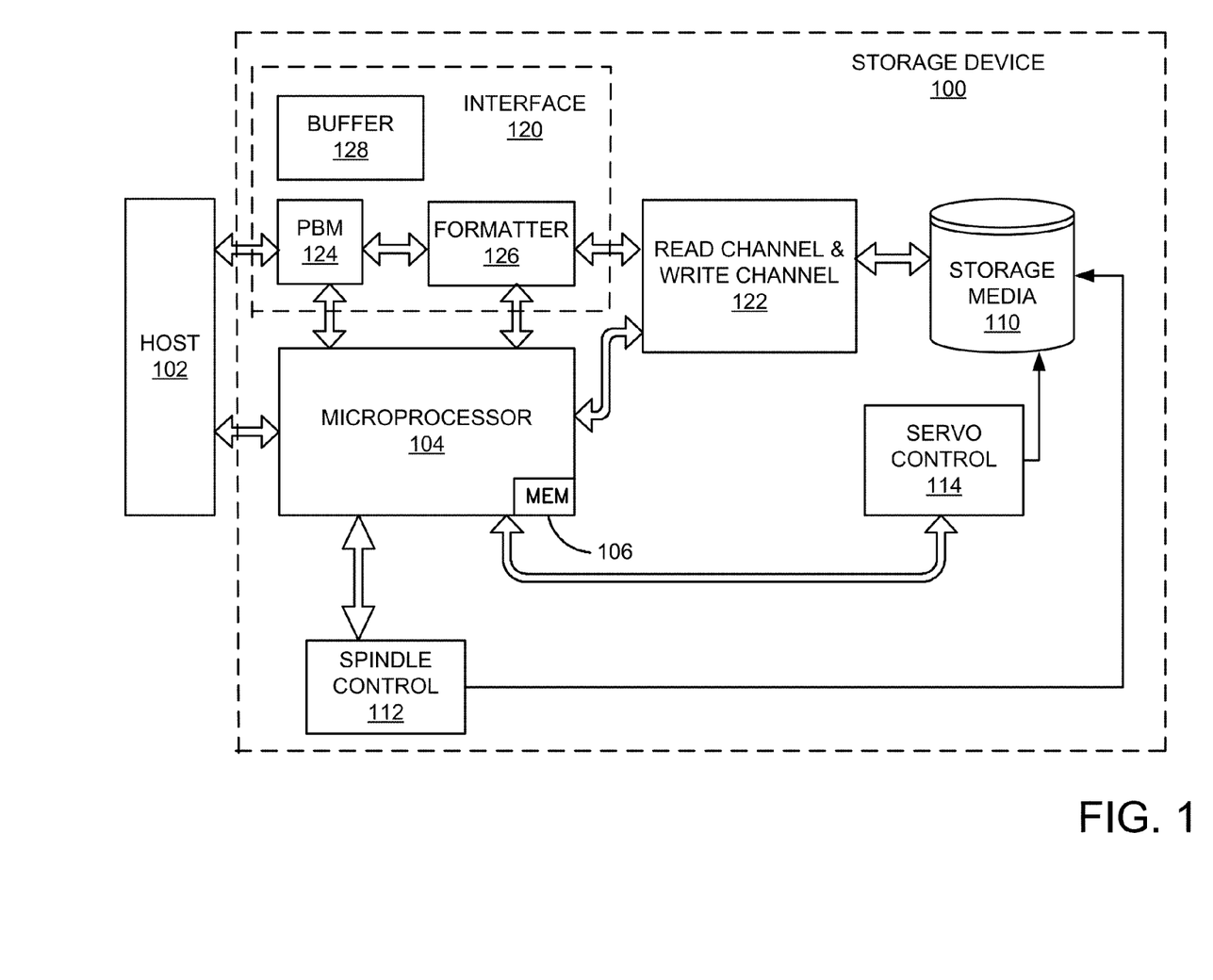
FIG. 1 illustrates example functional components of a storage device.

FIG. 1 illustrates the primary functional components of a storage device 100, such as incorporating one of the various implementations of the read-channel throughput management system described herein. Specifically, FIG. 1 shows one or more functional circuits that are resident on a disc drive printed circuit board used to control the operation of the disc drive. The storage device 100 is operably and communicatively connected to a host computer 102. Control communication paths are provided between the host computer 102 and a disc drive microprocessor 104, the microprocessor 104 generally providing top-level communication and control for the storage device 100 in conjunction with programming for the microprocessor 104 stored in microprocessor memory (MEM) 106. The MEM 106 can include random access memory (RAM), read only memory (ROM) and other sources of resident memory for the microprocessor 104. Storage device 100 stores data on a storage media 110 such as magnetic discs, optical discs, etc. The storage media 110 are rotated at a constant high speed by a spindle motor control circuit 112. A servo control circuit 114 provides control for moving an actuator that moves heads between tracks on the storage media 110 and controls the position of the head.

Communication paths are provided between the host computer 102 and the storage media 110 via an interface 120 and a number of read/write channels 122 (referred to hereinafter as read channel 122 or as write channel 122). The interface 120 includes a disc drive platform buffer manager (PBM) 124, a buffer 128 and a formatter 126 (also known as common formatter, disc formatter, etc.). Data is transferred between the host computer 102 or other device and the storage device 100 by way of the interface 120. The buffer 128 facilitates high-speed data transfer between the host computer 102 or other device and the storage device 100. Data to be written to the storage device 100 is thus passed from the host computer 102 to the interface 120 and then to the write channel 122, which encodes and serializes the data into data symbols and provides the requisite write current signals to the heads of the storage media 110.

To retrieve data that has been previously stored in the storage media 110, read signals are generated by the heads of the storage media 110 and provided to the read channel 122. In one implementation of the storage device 100, the read channel 122 performs decoding and error detection and correction operations and outputs the retrieved data to the formatter 126 for subsequent transfer to the host computer 102 or other device.

In one implementation of the storage device 100, the storage media 110 identifies data sectors on tracks without data sector headers. Removing headers from the data sectors increases the space available for data storage but complicates identification of data sectors, splits, and defects. In a read operation for a storage device 100 having such a headerless track format on the storage media 110, the formatter 126 should know the physical track format before it can locate sectors of the storage media 110 to be read. In one implementation, the formatter maintains in some manner an "image" of the current data wedge (i.e., the space between servo fields) passing under the read head. Therefore, the formatter "knows" in advance of each data wedge the configuration, location, and addresses of all the data in that data wedge, including the sector "split" locations at the beginning and end of the data wedge.

In one implementation, to begin a read operation, the formatter 126 waits for the target sector to reach the read head. Then the formatter 126 asserts a Read Gate (RG) signal to the read channel 122 and waits while the read channel 122 locks its phase locked oscillator (PLO) circuit to the pattern in a PLO field and searches for the synchronization pattern. When the read channel 122 finds the synchronization pattern, it begins decoding the non-return to zero (NRZ) symbols that follows the synchronization pattern. After the read channel 122's data decoding delays, the read channel 122 sends the synchronization handshake to the formatter 126 over the NRZ interface, followed by decoded user symbols. The formatter 126 counts the symbols it receives after the sync handshake, and references its subsequent RG deassertion timing (and the next RG assertion timing, if another sector is to be read) from that synchronization handshake. In such an implementation, the formatter 126 is therefore aware of the read channel 122's decoding delay, which affects the formatter 126's subsequent RG assertion timing.

Near the end of the user data field, the formatter 126 deasserts RG when it knows that the front end of the read channel 122 has captured all of the user data and pad data. The read channel 122 continues to decode and transfer data from its decoding pipeline for a fixed (preprogrammed) number of NRZ symbols after RG deassertion, which represents the Read Gate Extend time.

The data from the read channel 122 is typically received serially at the formatter 126. The formatter module 126 synchronizes and frames the data and transfers the data to the platform buffer manager (PBM) 124. A host device, such as a host computer 102, is communicatively connected to the PBM to receive the data from the PBM 124.

When a seek command is executed by a host device 102, the read channel 122 undertakes some soft decoding of the data read from the storage media 110. In some implementations, the formatter 126 is also responsible for correction of the decoded data. However, in cases of an aggressive seek command executed by read channel 122, more and more of the correction operation, including recovery of sectors, is undertaken by the read channel 122. In such cases, the formatter 126 gets a status from a read channel 122 as to whether the sectors read from the storage media 110 are recoverable or not. Subsequently, the formatter 126 takes the decision as to the status of sector read. If the sectors read by the read channel 122 are recoverable, the formatter 126 transfers the data to the PBM 124.

However, when the sectors read by the read channel 122 are not recoverable, generally the formatter 126 does not have the ability to process it any further. The formatter 126 verifies the data received from the read channel 122 by performing parity check operation on the received data. When the parity check fails, specifically in the case of unrecoverable data sectors transferred from the read channel 122 to the formatter 126, the formatter 126 sends a signal to the read channel 122 to close the read gate between the read channel 122 and the storage media 110. In such a case, the read channel 122 performs another read operation for the unrecoverable sectors. However, such another read operation is typically undertaken during the next revolution of the storage media 110.

In an example implementation, the read channel 122 decodes the data received from the storage media 110 using an iterative decoding algorithm. An example of an iterative decoding algorithm used by the read channel is a low-density-parity-check (LDPC) algorithm to correct additional bit errors using successive iterations within an iterative detector. However, such iterative decoding within the read channel 122 results in some data sectors that are hard to recover or decode, requiring additional, and often, inordinately longer time for convergence of the iterative decoding algorithm. Such extra time in decoding hard-to-recover or hard-to-decode sectors results in the read channel 122 dropping a channel ready signal (CHN_RDY_CF) to the formatter 126. As a result, the formatter 126 (via the microprocessor 104) does not raise the read-gate (RG) gate between the read channel 122 and the storage media 110.

However, according to an implementation of the read channel throughput management system disclosed herein, the read channel 122 defers decoding a difficult to recover sector. Subsequently, the read channel 122 sends a pulse (for example, a CHN_DEF_DEC_CF signal) to the formatter 126 indicating that the sector decoding for the current sector is deferred. After sending the signal, the read channel 122 proceeds to process the sectors following the deferred sector. In one implementation, the read channel 122 continues processing such ensuing or subsequent sectors until it encounters another sector that has to be also deferred from being decoded. Alternately, the read channel 122 continues the read operation until the read transfer has ended. Yet alternately, the read channel 122 continues the read operation until the read data-path transfer has caught up with the media transfer from the storage media 110 and all sectors read from the storage media 110, except the previously deferred sectors, are in the memory of the read channel 122 for processing.

In one implementation, the read channel throughput management system disclosed herein determines that at most two sectors can have their decoding deferred during a read-disc transfer. Alternately, a smaller or larger number of sectors can be set aside for deferred decoding. In one implementation, when a sector is selected by the read channel 122 for deferred decoding, the associated data is pinned in an elastic buffer of the read channel 122. Such sectors from the elastic buffer of the read channel 122 are used later for decoding when the read channel 122 receives a pulse (for example, a CF_DEC_DEF_CHN signal) from the formatter 126 to initiate decoding these sectors. In one implementation, the formatter 126 sends only one pulse to the read channel to start decoding all sectors saved on the read channel's 122 elastic memory. In an alternate implementation, the formatter 126 sends one pulse each for decoding of each sector saved in the read channel's 122 elastic memory. Until the read channel 122 receives the pulse from the formatter 126 to start decoding the sectors saved on the read channel's 122 elastic memory, the elastic memory operates in a mode wherein pointers jump past the pinned sample data associated with the sectors being deferred for decoding.

In one implementation, the interface between the formatter 126 and the PBM 124 is updated to provide communication regarding the deferred decoding of difficult to recover sectors by the read channel 122. For example, a pulse from the formatter 126 to the PBM 124 indicates to the PBM that a formatter transfer of a sector has been deferred. Upon receipt of such a signal, the PBM saves the current virtual buffer manager (VBM) link and updates the VBM link to transfer the subsequent or ensuing sector received from the formatter 126.

Another pulse from the formatter 126 to the PBM 124 indicates to the PBM 124 that a previously deferred transfer of a sector is ready to be transferred. In response, the PBM restores the association of the VBM link that has been saved by the PBM 124 to such deferred transfer of a sector.

During an example operation, suppose that the position of the read head is at a sector 10 when the host 102 sends a read command to the storage device 100 for reading sectors 20-24. In such a case, because the storage device 100 has to move the read head from sector 10 to 20 before it starts reading the required data sectors, the storage device 100 decides to opportunistically read sectors 16-19 as well. Such a decision to read sectors 16-19 is based on the current position of the read head at sector 10 and further based on the time it takes for the read head to be on track of the recording media.

For example, the storage device 100 determines that given the current position of the read head at sector 10 and given the past usage, the read head will stabilize by the time it reaches the sector 16. In other words, the storage device 100 determines that the data read during the movement of the read head from sector 10 to sector 15 will not be recoverable. However, according to an implementation disclosed herein, the storage device 100 performs an opportunistic seek in that it will read data from sectors 12-15 as well. In such an example implementation, the data read from sectors 12-15 may include one or more unrecoverable sectors.

For example, the read channel 122 may determine that sector 14 is difficult to recover, however, sectors 12, 13 and 15 are not difficult to recover. In such a case, the read channel 122 will save the data from sector 14 in the read channels' 122 elastic memory for further decoding but perform a read transfer to the formatter 126 according to the steps described above.

According to an alternate implementation of the read channel throughput management system disclosed herein, the formatter 126 is programmed with one or more criteria that can be used to analyze a series of sectors received from the read channel 122 and to determine that the early opportunistic data received from the read channel 122 is being read successfully enough. Based on such a determination, the formatter 126 decides that the ensuing or subsequent sectors can now be processed beyond an NRZ interface sub-block in the formatter 126. An example of such criteria may include receiving of a status from the read channel 122 that a predetermined number of sectors in a row have converged. For example, such a predetermined number is 4, in which case, anytime the read channel 122 provides an indication that at least 4 sectors in a row have converged, the formatter 126 can now allow processing of the ensuing or subsequent sectors beyond the NRZ interface sub-block in the formatter 126.

When an aggressive seek is initiated in the context of a zero-latency read operation based on the current location of a read-head, the read channel 122 generally ends up with one or more non-converged sectors as discussed above. Such aggressive seek operation to acquire opportunistic data from track often results in terminating the ensuing or subsequent sectors from being processed due to the data being read containing too many errors. Such data errors may be due to the head not having settled sufficiently and reliably, etc. This results in the storage device 100 having to waste a revolution. This limits the usefulness of the zero-latency read feature for acquiring opportunistic data. In addition, generally it is not feasible to increase the reliability of reading subsequent sectors by training the read channel 122 as the non-converged sectors in the pre-read results in halting of the formatter 126 and termination of the overall disc read transfer.

In one implementation of the read channel throughput management system disclosed herein, the formatter 122 is able to program the hardware comprising the formatter 126 and the channel 122 (together referred to hereinafter as the "formatter hardware") with one or more criteria that enables the formatter hardware to consider the initial data read from the storage media 110. In one implementation, such initial data read from the storage media 110 that meets the one or more criteria is processed later subject to one or more conditions. Particular applicable conditions are generally based on the particular criterion used to consider the initial data read from the storage media 110.

In effect, the one or more criteria provided to the formatter hardware creates a tuning mechanism that analyzes the initial data read from the storage media 110 to generate one or more estimates about the subsequent data read from the storage media 110. Providing the formatter hardware with such criteria allows determining, for example, when early reading of opportunistic data is more likely to have higher noise content and therefore, a greater likelihood of an unconverged sector, a sector for which parity check equation did not converge, causing the overall disc read to terminate. Providing the formatter hardware with such criteria also allows determining the nature of the ensuing or subsequent sectors following the early read sectors. As a result, the formatter hardware is able to process such downstream data without having the decoding hardware to work too intensively that a revolution is missed. Thus, providing the formatter hardware with the one or more criteria allows using the very early sectors read from the storage media 110 as a means for tuning the processing of the subsequent sectors and for tuning the overall read operation for optimal execution.

In one implementation, the read channel 122 provides a status signal to the formatter hardware that a predetermined N number of sectors in a row have converged. For example, the criterion used by the read channel 122 provides for evaluating four sectors of opportunistic data in a row, and if all four sectors have converged, the read channel 122 generates a signal identifying that the next twelve sectors of opportunistic data is good. In one implementation, the number of sectors that are evaluated is based on the type of data read (higher number required for control data compared to, for example, audio data). Yet alternatively, the number of evaluated sectors is based on the location of the track on the recording media. Alternatively, the read channel 122 provides a predetermined minimum number of sectors to be discarded irrespective of whether the sectors have converged or not. In such an implementation, for example, irrespective of the data read, the first six sectors are always discarded. A combination of the criterion requiring reading a minimum number of data sectors together with evaluating a predetermined number of data sectors can also be used.

Another signal generated by the read channel 122 provides a signal suggesting that at least a predetermined number of sectors p have converged per a predetermined q number of sectors read. The formatter hardware uses such status signals to determine processing of the ensuing or subsequent sectors. In one implementation, the N is programmed so large that the all pre-read sectors are streamed and the initial sector processed by the formatter hardware is the initial sector of the data read from the storage media 110 following the pre-read.

In one implementation, one or more of the numbers N, p, q, etc., are programmed into a register on the formatter 126. In such an implementation, all early opportunistic sectors read from the storage media 110 prior to meeting the programmed criteria in the formatter 126, and any sectors that are present in the decoding pipeline of the read channel 122 will have their data discarded by the formatter 126 such that they will not be processed by formatter hardware. In one implementation, the formatter 126 tracks how many sectors were discarded in a streaming mode so that the same number of sectors is decremented from the disc-start sector count.

In an alternate implementation, one or more of the numbers N, p, q, etc., are programmed into a register in the read channel 122. In such an implementation, one or more corner conditions, such as where the pre-read data ends and with respect to the first sector acquired from the storage media 110 is known only to the formatter 126. In such an implementation, an additional signal from the formatter 126 to the read channel 122 may be required to indicate when to switch from streaming mode to non-streaming mode. Moreover, if during a pre-read, a criterion of successful decoding of N sectors is not met, the formatter 126 sends a signal to the read channel 122 at the end of the pre-read region to go into non-streaming mode.

In an implementation wherein the formatter hardware is provided with one or more criteria as discussed above, the formatter 126 provides one or more signals to the read channel 122 to notify the read channel 122 of the level of processing for given sectors. For example, a combination of signals CF_STREAM_MAX_CHN and CF_STREAM_MIN_CHN can be provided from the formatter 126 to the read channel 122. Here the CF_STREAM_MIN_CHN signals the formatter's 126 intent to have the read channel 122 work minimally in recovering a sector whereas the CF_STREAM_MAX_CHN signals the formatter's 126 intent to have the read channel 122 work maximally in recovering a sector.

According to one implementation, when CF_STREAM_MIN_CHN is asserted, irrespective of the CF_STREAM_MAX_CHN signal level, the read channel 122 works minimally to recover a sector. When CF_STREAM_MIN_CHN is not asserted, the read channel 122 works maximally to recover the sectors without stalling the transfer of sectors from the read channel 122 to the formatter 122. However, when the CF_STREAM_MAX_CHN is asserted without the CF_STREAM_MIN_CHN being asserted, the read channel 122 works maximally to recover the sectors even if has to stall the transfer of sectors from the read channel 122 to the formatter 122.

Figure 2:
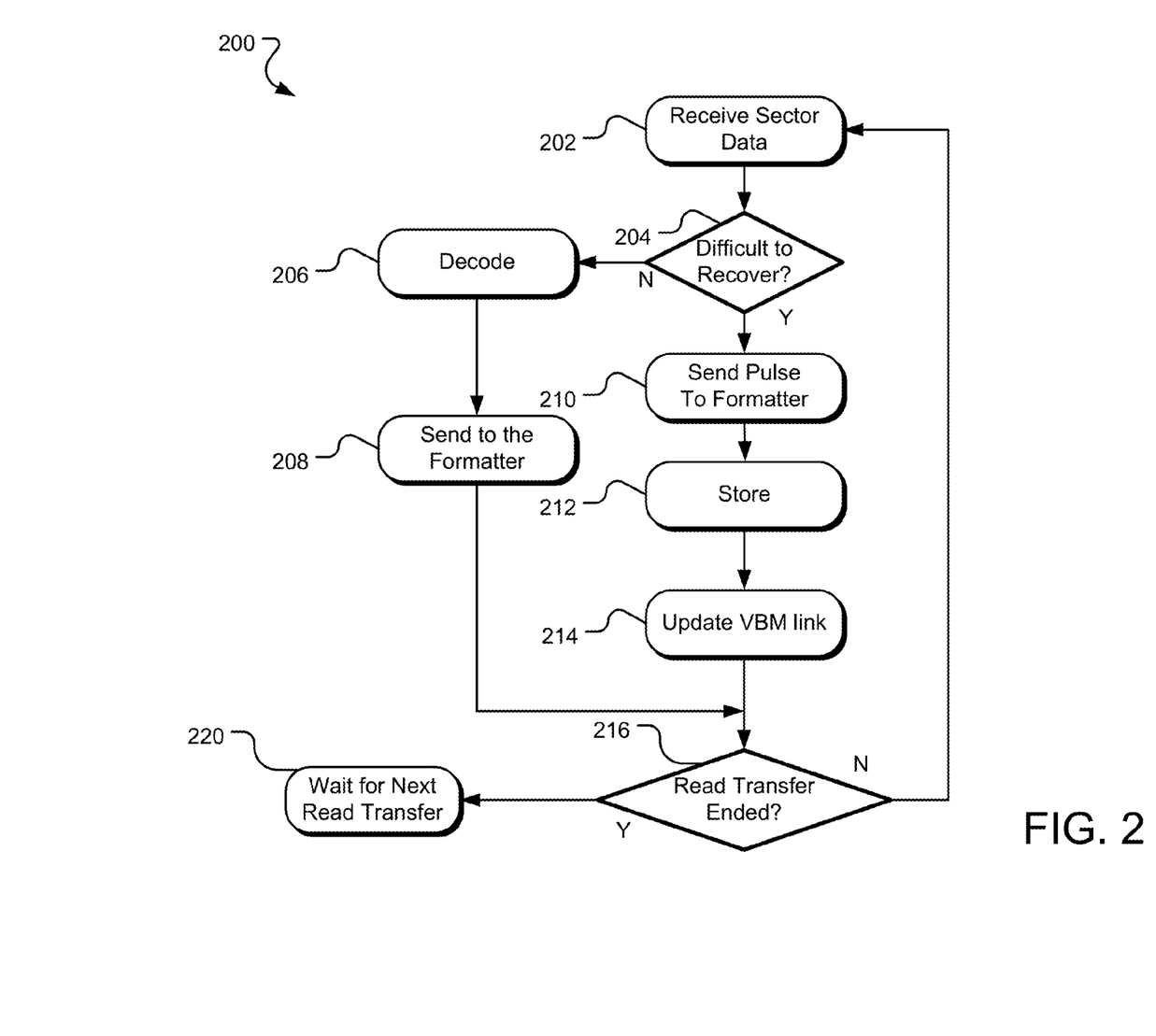
FIG. 2 illustrates an example flowchart including operations for processing data sectors read from storage media.

FIG. 2 illustrates an example flowchart 200 including operations implemented in a storage media for processing data sectors read from a storage media. A receiving operation 202 receives sector data from the storage media into a read channel. Subsequently, a determination operation 204 determines if the received sector data is difficult to recover sector data for the read channel. If it is determined that the data is not difficult to recover, a decoding operation 206 decodes the data sector at the read channel using a standard decoding algorithm. Subsequently, a sending operation 208 sends the decoded data sector to the formatter.

If the determining operation 204 determines that the data sector is difficult to recover, a sending operation 210 sends a pulse to the formatter to inform the formatter that the current data sector is difficult to recover and therefore, the decoding of the current sector has been deferred. After sending the signal, a storing operation 212 stores the deferred sector data in memory of the read channel for future processing. Subsequently, a determination operation 214 determines if the read transfer has ended. If it is determined that the read transfer has ended, the read channel waits for a next read transfer command from a host. If the determination operation 214 determines that the read transfer has not ended, control is transferred to the receiving operation 202 to receive next sector data.

In an implementation of the system disclosed herein, the read channel includes two different decoders, one running at a regular clock rate and another decoder running at a slower clock rate. When the deferred data sector is stored in a memory of the read channel, the second decoder running at the slower clock rate may be used to decode such deferred data sectors. Such a second decoder is used to do off-line or on-the-fly recovery of the deferred data sectors. Alternately, the read channel waits for a signal from the formatter to start decoding the deferred data sectors from the read channel memory using the decoder at normal clock rate.

Figure 3:
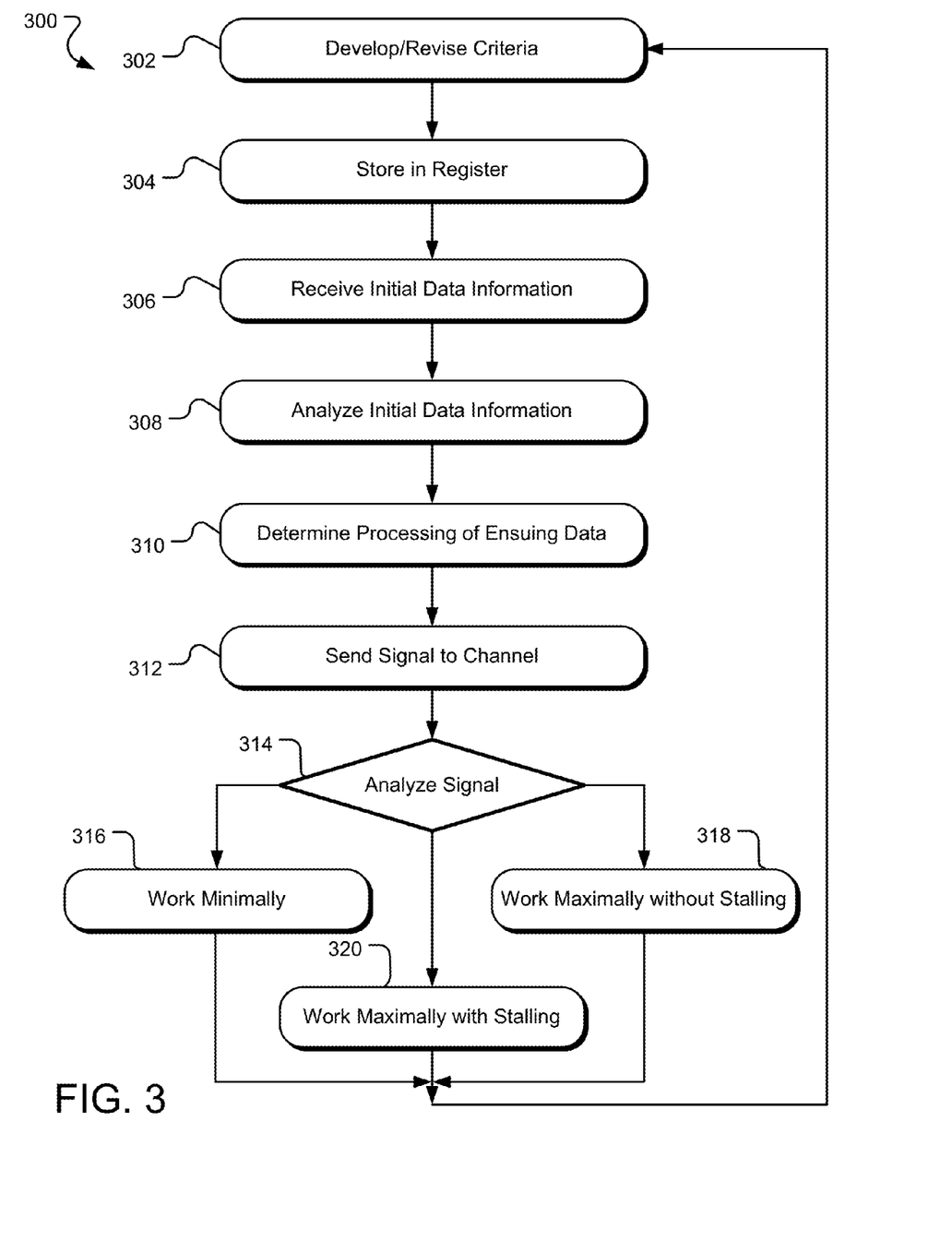
FIG. 3 illustrates an alternate example flowchart including operations for processing data sectors read from storage media.

FIG. 3 illustrates an example flowchart 300 including operations implemented in a storage media for processing sectors read from a storage media. In one implementation, the operations disclosed in FIG. 3 are used to analyze opportunistic data collected in aggressive seek mode of storage media read operation. However, these operations can also be applied to data read during other modes of storage read operations. For example, if a XFR_HOST command specifying data sectors 100 to 699 is received by a storage device when the read head of the storage device is at sector 0, the storage device may be used in an aggressive seek mode to read data sectors 10 through 99 opportunistically. In one implementation, the operations disclosed in FIG. 3 are used to process such opportunistic reading of sectors 10 through 99.

A developing operation 302 develops one or more criteria for analyzing data sectors received from a storage medium. The criteria may specify how to treat certain data sectors read in response to a data read command in presence of pre-read opportunistic data in aggressive seek mode. In the present example, the criteria may specify how to treat, for example, data sectors 20-30 based on one or more parameters of data sectors 10-20. An example of such a criterion specifies that if a series of ten data sectors received from a read channel includes at least three sectors in a row that have converged, the read channel can process the ensuing or subsequent sectors minimally. An alternate criterion may be that if any five sectors of such ten data sectors have converged, the read channel can process the ensuing or subsequent sectors minimally.

Subsequently, a storing operation 304 stores such one or more criteria in hardware registers of a read channel. In one implementation, while the one or more criteria are programmed into a register in the read channel, other corner conditions, such as where the pre-read data ends with respect to the first media sectors acquired (track offset), is only known by the formatter.

A receiving operation 306 receives information about initial pre-read data from a read channel. Such information about the initial pre-read data may include information about which of these data sectors have converged, that is successfully decoded by the read channel, which data sectors did not converge, how many iterations were necessary to achieve convergence, etc. Subsequently, an analysis operation 308 analyzes the information about the initial data. Such analysis may include, for example, determining the number of data sectors that are unconverged, the average number of iterations necessary per data sector, etc. The analysis operation 308 also analyzes the information about the initial data using the one or more criteria developed at operation 302. In one implementation, the criterion is a threshold percentage of the initial data sectors for which the decoding resulted in a converged decoder output.

A determination operation 310 uses the results of such analysis to determine the processing of the ensuing or subsequent data. For example, based on the analysis of the initial data, the determination operation 310 may determine that given the number of data sectors have converged it is sufficient for the read channel to minimally process the ensuing or subsequent data. Alternately, the determination operation 310 may determine that given the small number of the pre-read data sectors that have converged, the read channel should maximally process the ensuing or subsequent data, even if that results in stalling the data transfer.

Based on the results of the determination operation 310, a sending operation 312 sends one or more signals to the read channel. An example of the signal sent to the read channel include a CF_STREAM_MAX_CHN signal, a CF_STREAM_MIN_CHN signal, etc. subsequently, an analysis operation 314 analyzes the signal received at the read channel to determine the processing of the subsequent data sectors. For example, the read channel gives higher priority to the CF_STREAM_MIN_CHN signal's intent to have the read channel work minimally using operation 316. If the CF_STREAM_MIN_CHN signal goes low with the CF_STREAM_MAX_CHN signal still at high level, an operation 318 processes the ensuing or subsequent data by working maximally to recover the data, however, without stalling the data transfer to the formatter When the CF_STREAM_MAX_CHN signal goes low, an operation 320 processes the ensuing or subsequent data by working maximally to recover the data, even if it results in stalling the data transfer to the formatter. In such a case, the read channel will drop a CHN_RDY_CF signal to the formatter. Finally, the control is transferred back to the development operation 302 with the additional information so that the development operation 302 can revise the one or more criteria.

Figure 4:
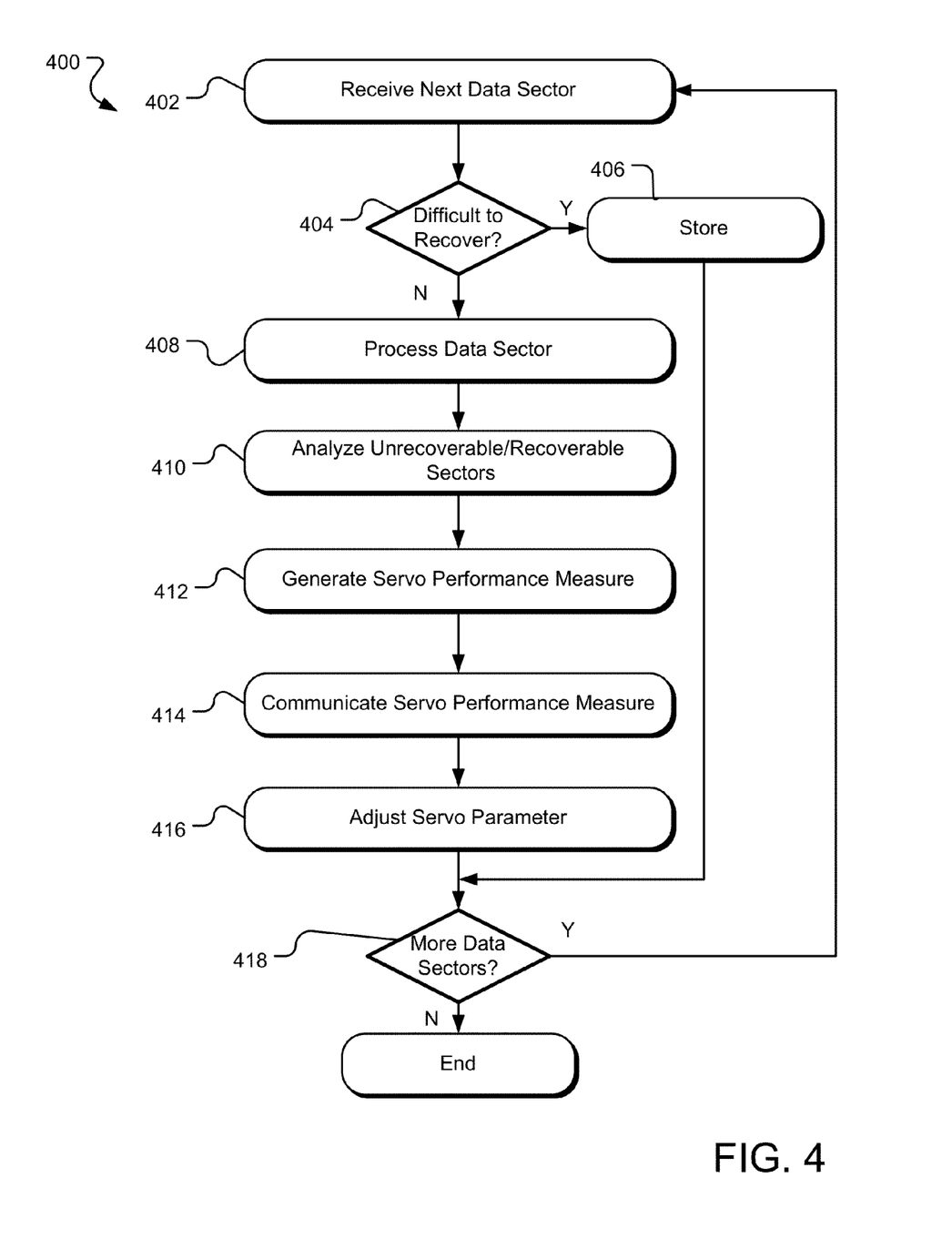
FIG. 4 illustrates an example flowchart including operations for adjusting one or more servo parameters of a storage device.

FIG. 4 illustrates a flowchart 400 including operations for adjusting one or more servo parameters in response to analysis of data sectors. A receiving operation 402 receives data sectors from a storage media. For example, the receiving operation 402 receives data sectors from a storage media into a read channel. In one implementation, the data sectors include one or more opportunistic data sectors received by the storage device operating in aggressive seek mode. As a result, the received data sectors may include one or more difficult to receive data sectors.

A determination operation 404 determines if a particular data sector is a difficult to recover data sector. The determination operation 404 may make such determination based on the convergence of a decoding operation after a predetermined number of iterations. If it is determined that a particular data sector is a difficult to recover data sector, a storing operation 406 stores that data sector in a memory in the read channel for later processing. However, if it is determined that a particular data sector is a not a difficult to recover data sector, a processing operation 408 processes that data sector. Thus, the processing operation 408 may process one or more data sectors out of order.

Subsequently, an analysis operation 410 analyzes information about the unrecoverable and recoverable data sectors. For example, the analysis operation 410 determines the percentage of data sectors that are unrecoverable, the average number of iterations of a decoding algorithm used to recover data sectors, etc. A generating operation 412 generates one or more servo performance measures based on the analysis of the unrecoverable and recoverable data sectors. Subsequently, a communication operation 414 communicates the servo performance measure to a servo-mechanism of the storage device. Upon receiving the servo performance measure, an adjusting operation 416 adjusts one or more servo parameters. For example, the adjusting operation may adjust the speed of the read head during an aggressive seek operation, during opportunistic read operation, etc. In an alternate implementation, the adjusting operation optimizes the read throughput of the read head based on the servo performance measure. For example, the read throughput of the read head is provided in number of revolutions needed to get a specified amount of data. The method disclosed herein allows the read head to achieve higher levels of throughput.

Although the block diagrams and flowcharts disclosed herein describe various embodiments in the context of storage devices for purposes of illustration and explanation, it is to be understood that the technology disclosed herein can be more broadly used for any type of servo control loop that can be subject to vibration.

In one implementation, the block diagrams and flowcharts disclosed above are implemented in hardware and/or in software (including firmware, resident software, micro-code, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   deferring decoding of a data sector received at a read channel of a storage device, in response to determining that the data sector cannot be decoded by a first decoder; and
   storing the data sector for further processing by a second decoder running at a clock rate lower than a clock rate of the first decoder.

2. The method of claim 1, wherein the data sector is read during an aggressive seek read operation.

3. The method of claim 2, further comprising:
   decoding the data sector using the second decoder.

4. The method of claim 1, further comprising:
   communicating a signal to a formatter indicating the deferring of decoding the data sector; and
   reading an ensuing data sector following the deferred data sector.

5. The method of claim 4, further comprising:
   communicating a signal from the formatter to a platform buffer manager (PBM) to indicate the deferring of decoding the data sector; and
   updating a virtual buffer manager (VBM) link at the PBM to transfer the ensuing data sector from the formatter.

6. The method of claim 1, further comprising:
   determining a decoder output based on decoding of a number of initial data sectors at the read channel; and
   determining processing of the ensuing data sectors based on analyzing the decoder output using a criterion.

7. The method of claim 6, wherein the decoder output is a percentage of the initial data sectors for which the decoding resulted in a converged decoder output and the criterion provides a threshold percentage.

8. The method of claim 1, further comprising analyzing a number of read operations during an aggressive seek operation to generate a servo performance measure indicating a percentage of recoverable data sectors.

9. The method of claim 8, further comprising communicating the servo performance measure to a servo controller of the storage device.

10. The method of claim 9, further comprising adjusting the speed of reading data from the storage media by the aggressive seek read operation based on the servo performance measure.

11. A storage device, comprising:
    a read channel configured to store a data sector after determining that the data sector cannot be decoded by a first decoder using a predetermined number of iterations of the first decoder, the read channel further configured to decode the stored data sector using a second decoder, wherein the second decoder runs at a clock rate lower than a clock rate of the first decoder.

12. A storage device, comprising:
a read channel configured to store a data sector after determining that the data sector cannot be decoded by a first decoder using a predetermined number of iterations of the first decoder, and wherein the read channel is further configured to communicate a signal to a formatter indicating decoding deferment of the initial data sector and to read an ensuing data sector following the deferment.

13. The storage device of claim 12, wherein the data sector is a data sector read during an aggressive seek read operation.

14. The storage device of claim 12, further comprising an analysis module configured to analyze a percentage of decoded data sectors over a number of aggressive seek read operations to generate a servo performance measure.

15. The storage device of claim 12, wherein the formatter is configured to communicate the signal to a platform buffer manager (PBM) to indicate the decoding deferment of the initial data sector.

16. The storage device of claim 15, wherein the PBM is configured to update a virtual buffer manager (VBM) link to transfer the ensuing data sector from the formatter.

17. The storage device of claim 14, wherein the analysis module is further configured to communicate the servo performance measure to a servo controller of the storage device.

18. The storage device of claim 14, further comprising:
a servo controller configured to adjust a speed of reading data from the storage media based on the servo performance measure.

19. The storage device of claim 12, wherein the read channel is configured to determine a decoder output based on decoding the initial data sector and determine processing of the ensuing data sector based on an analysis of the decoder output using a criterion.

* * * * *